United States Patent [19]

Schrag et al.

[11] 4,255,985
[45] Mar. 17, 1981

[54] BALE-ACCUMULATING TRAILER

[75] Inventors: Thomas G. Schrag, Newton; Amos G. Hill; Howard R. Lohrentz, both of Hesston, all of Kans.

[73] Assignee: Hesston Corporation, Hesston, Kans.

[21] Appl. No.: 67,371

[22] Filed: Aug. 17, 1979

Related U.S. Application Data

[62] Division of Ser. No. 860,152, Dec. 14, 1977, Pat. No. 4,215,964.

[51] Int. Cl.³ ............................................ G05G 11/00
[52] U.S. Cl. ........................................ 74/479; 74/110; 251/78; 251/229
[58] Field of Search ............... 74/110, 479, 97, 100 R; 251/78, 229

[56] References Cited

U.S. PATENT DOCUMENTS

| 558,544 | 4/1896 | Wojan | 251/229 |
| 2,563,868 | 8/1951 | Reichard | 251/229 X |

FOREIGN PATENT DOCUMENTS 97178  3/1954  Netherlands .................. 74/479

*Primary Examiner*—Allan D. Herrmann
*Attorney, Agent, or Firm*—Schmidt, Johnson, Hovey & Williams

[57] ABSTRACT

A three-bale load is accumulated on the trailer as bales issue from the rear of the baler, whereupon the accumulated bales may be dumped all at the same location or singly as may be desired. Successive bales issuing from the baler arrive at a central platform from which they are alternately distributed to laterally disposed side platforms in an automated procedure. Once a side platform receives its bale, lockout mechanism prevents the transfer device from presenting the side platform with another bale until such time as the previous bale has been dumped. Once a bale has been dumped from a platform, the transfer device is automatically actuated, if indeed the next bale is ready to be transferred, for loading of the next bale onto the awaiting side platform. Special mechanism is employed to actuate a hydraulic valve of the transfer device in alternately opposite directions, notwithstanding the fact that the triggering input from a sensor that perceives the arrival of the next bale on the center platform is always in the same direction.

11 Claims, 19 Drawing Figures

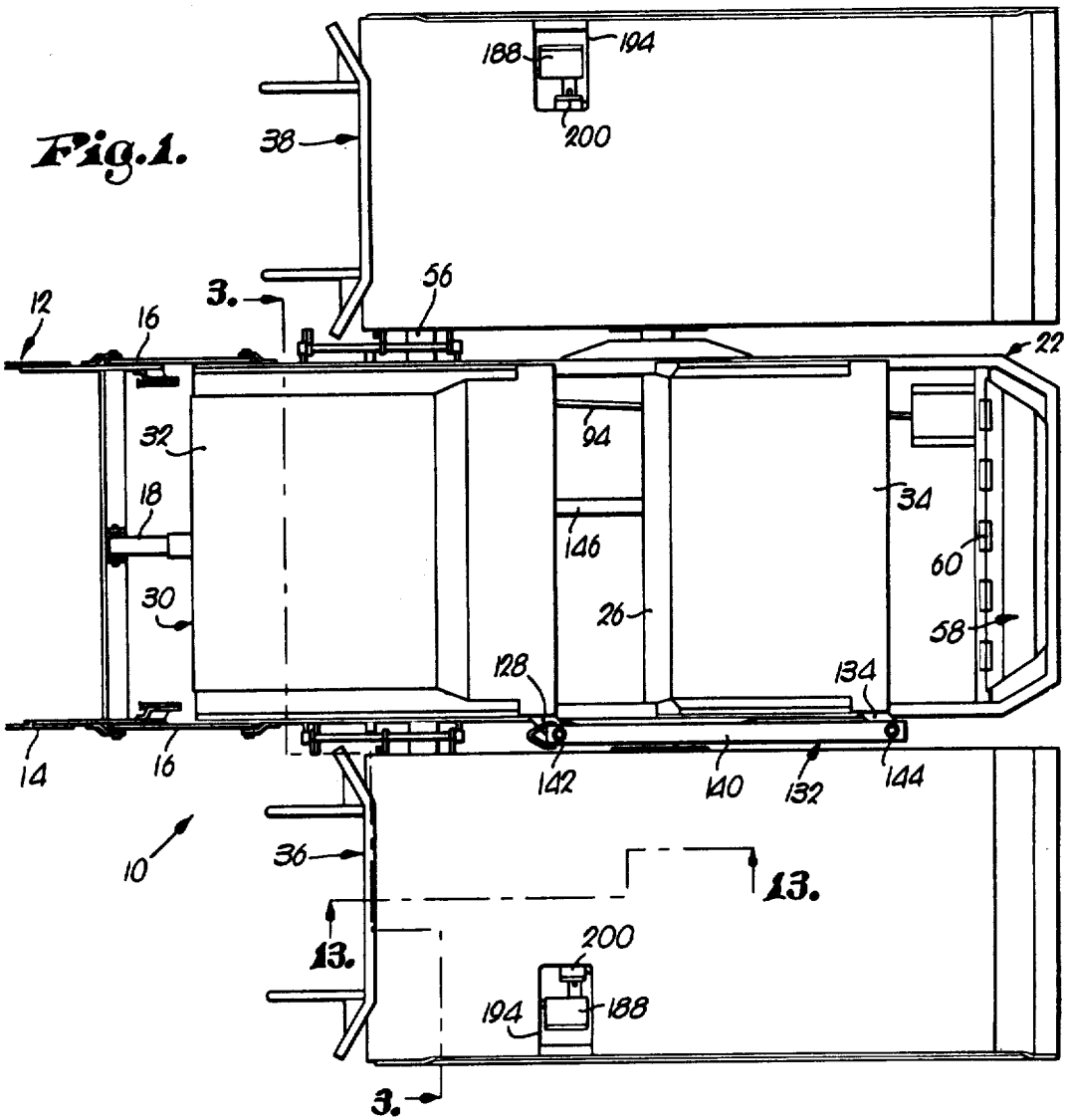
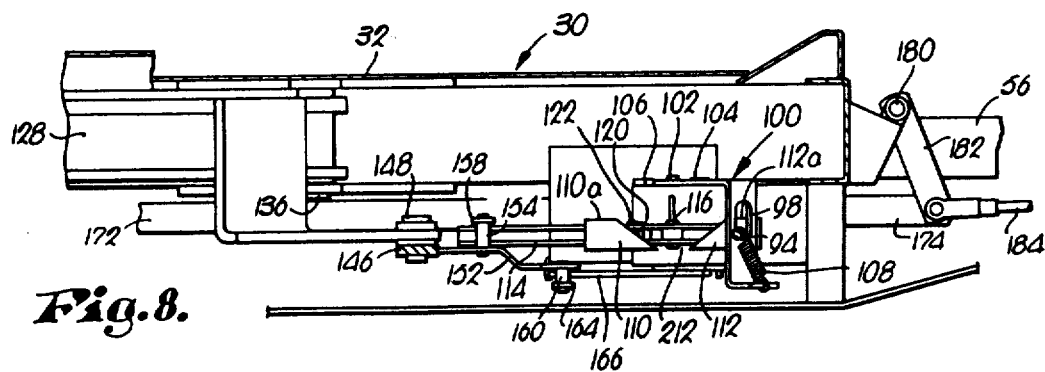

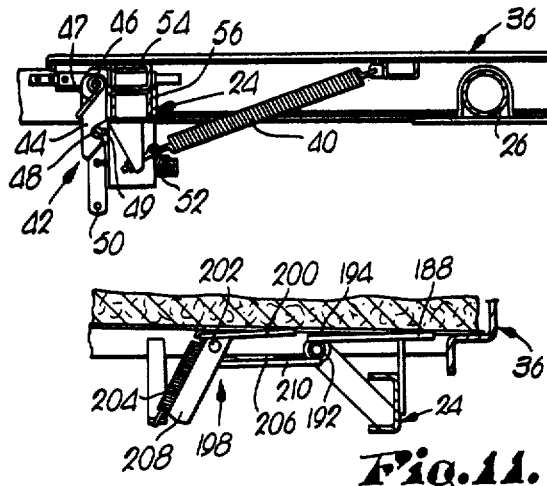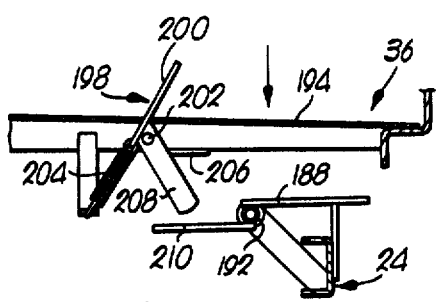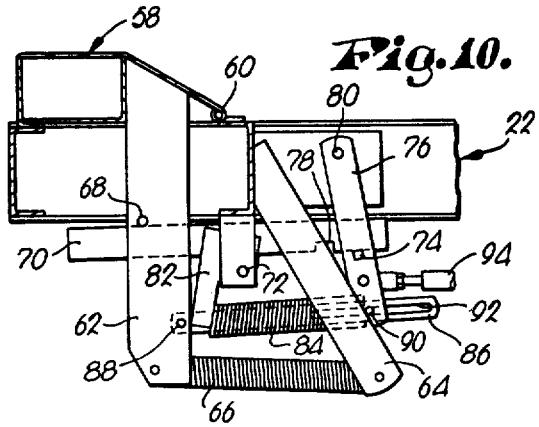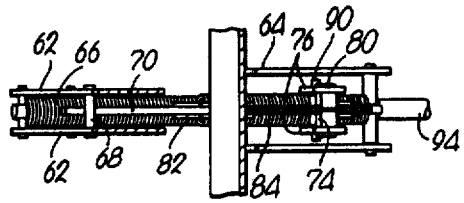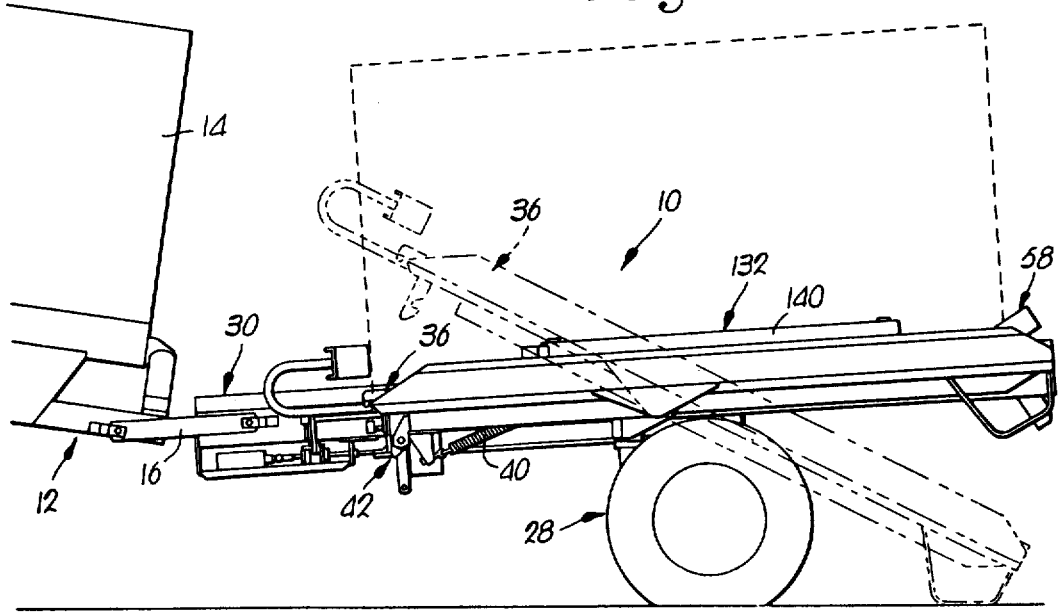

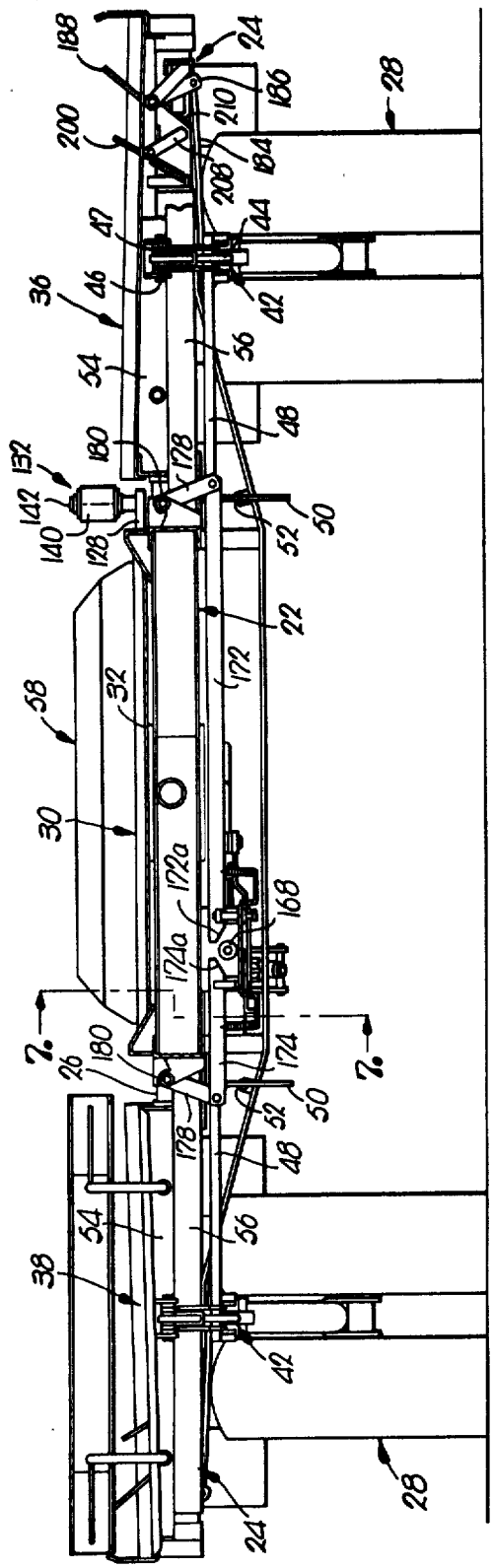

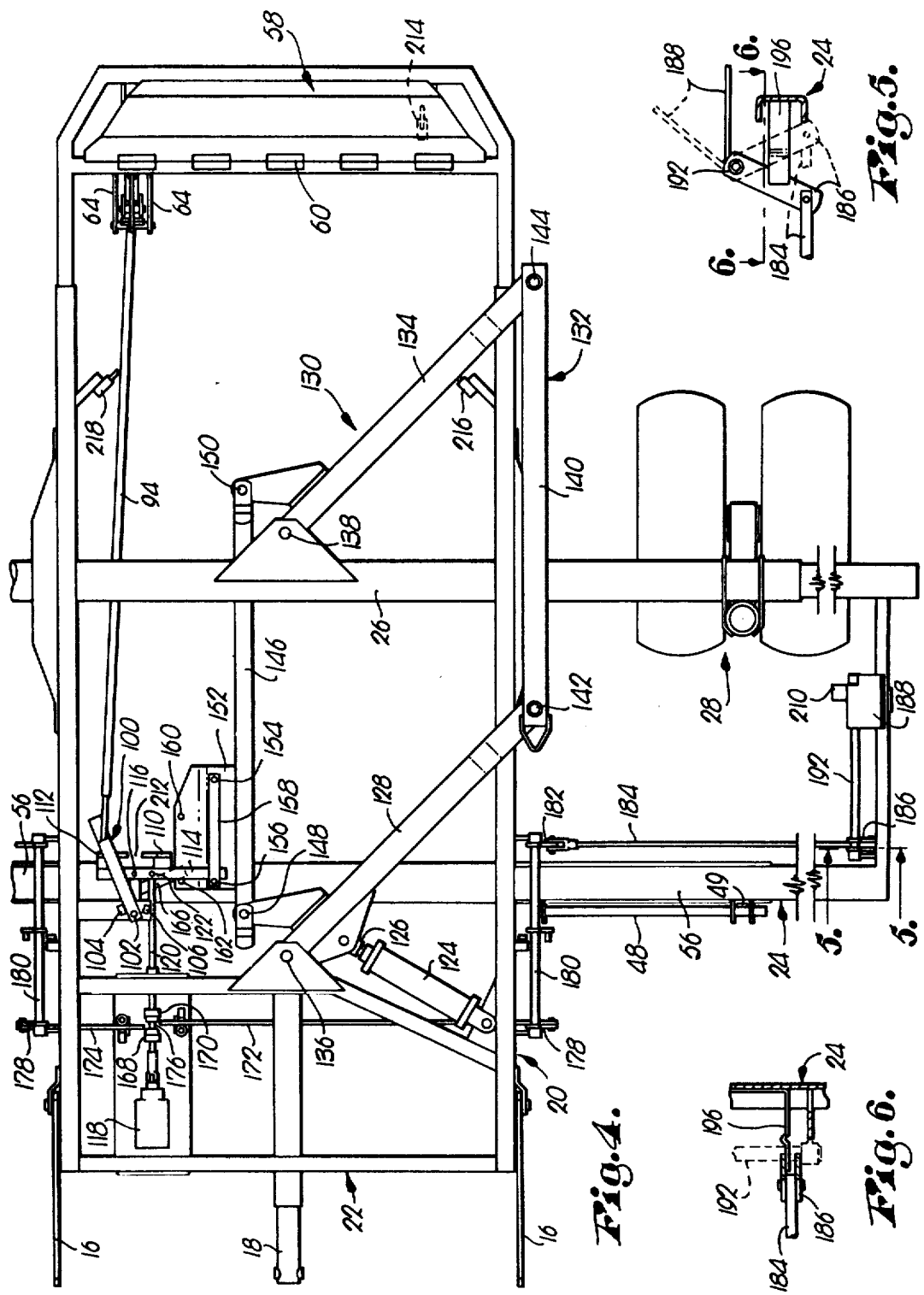

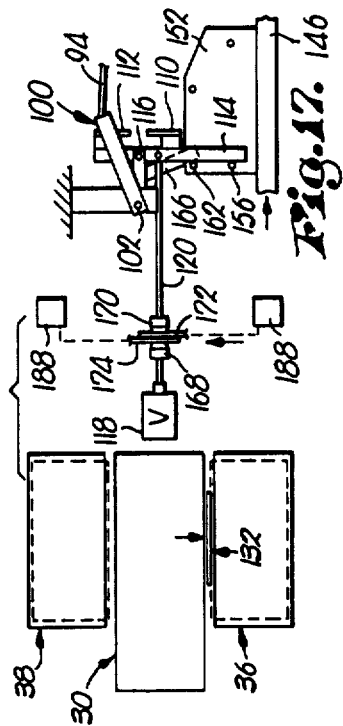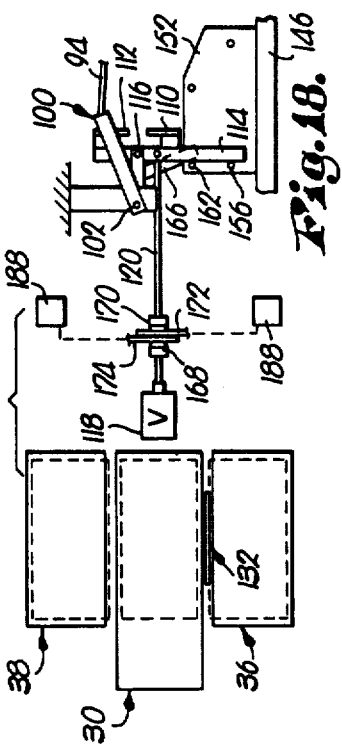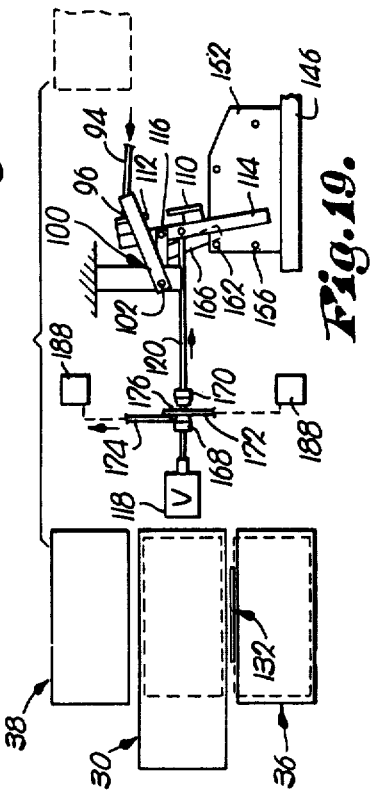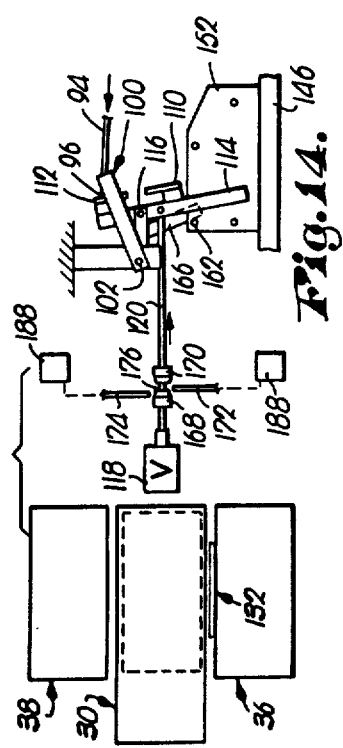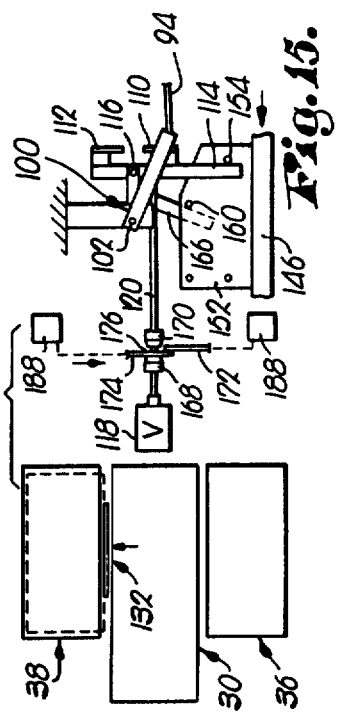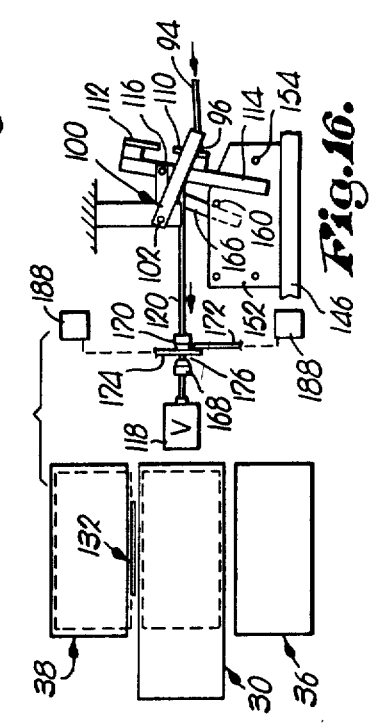

BALE-ACCUMULATING TRAILER

This is a division of application Ser. No. 860,152 filed on Dec. 14, 1977, now U.S. Pat. No. 4,215,964 issued on Aug. 5, 1980.

This invention relates to a trailer that attaches to the rear of a mobile crop baler for the purpose of accumulating a load of several bales as they issue from the baler, and holding them until the end of a row is reached so that the load can then be dumped in one pile, facilitating subsequent pickup and transport of the bales to other locations. The trailer of the present invention is particularly well-suited for use in conjunction with mammoth "square" balers capable of producing bales on the order of one ton or more (see, for example, U.S. Pat. No. 4,034,543, to Voth, et al, and No. 4,037,528, to White, et al, both owned by the assignee of the present invention). It will be apparent from the description and claims which follow, however, that the principles of the present invention are not limited to large balers of that type, but may, in fact, be utilized with great effectiveness in conjunction with small, conventional balers.

One important object of the present invention is to provide for the automatic formation of the accumulated load on the trailer, and yet permit the operator to be the sole judge of when the accumulated load is to be dumped. In this way the operator can postpone dumping, even though the load might be ready, until such time as he is lined up with previously dumped piles of the bales so as to facilitate the subsequent pickup and transport of the piles to other locations.

Pursuant to the foregoing, then, another important object of this invention is to provide for the automatic formation of a load by utilizing a transfer device which becomes automatically disabled and temporarily inoperable to transfer another bale into a position already occupied by another bale, even though triggering mechanism for the transfer device has already sensed that the next bale has arrived and is in position to be transferred.

A further important object of this invention is to maintain the transfer device inoperable during dumping of the accumulated bales, and yet render the device automatically actuated in response to completion of the dumping procedure.

An additional important object of the invention is to provide for such dumping of the load to be carried out individually at different locations as may be desired, or all at the same time at a single location.

The transfer device used in conjunction with the present invention is actuated alternately in opposite directions so as to distribute one bale arriving at a receiving station in one direction and then the next bale in the opposite direction. The sensing mechanism that perceives the arrival of a bale at the receiving station, however, is always actuated in the same way and cannot itself distinguish between a bale to be shifted leftwardly from one to be shifted rightwardly. Thus, a further important object of this invention is to provide a way of alternately reversing the hydraulic valve associated with the transfer device for alternately opposite actuation of the latter, notwithstanding the same type of nondiscriminatory triggering input from the sensing mechanism for both leftwardly and rightwardly bound bales.

In the drawings:

FIG. 1 is a top plan view of a trailer constructed in accordance with the principles of the present invention;

FIG. 2 is a side elevational view thereof illustrating more clearly the way in which the trailer is attached to the rear of a baler, and showing in one set of phantom lines the way in which the side platforms may be tilted downwardly and rearwardly to dump positions, a second set of phantom lines illustrating the position of a bale on the trailer with the platforms in a level condition;

FIG. 3 is a transverse, cross-sectional view through the trailer taken substantially along line 3—3 of FIG. 1;

FIG. 4 is a slightly enlarged, fragmentary elevational view of the trailer showing the central portion and left section thereof with certain top structures removed to reveal details of construction;

FIG. 5 is a slightly enlarged, fragmentary, cross-sectional view taken along line 5—5 of FIG. 4 showing portions of the operating linkage associated with the lockout mechanism for the actuating valve of the transfer device;

FIG. 6 is a fragmentary, cross-sectional view thereof taken along line 6—6 of FIG. 5;

FIG. 7 is a fragmentary, longitudinal, cross-sectional view through the trailer taken substantially along line 7—7 of FIG. 3;

FIG. 8 is a fragmentary, transverse, cross-sectional view of the trailer taken substantially along line 8—8 of FIG. 7;

FIG. 9 is a fragmentary, horizontal, cross-sectional view taken substantially along line 9—9 of FIG. 8;

FIG. 10 is a vertical, cross-sectional view of the rearmost end of the trailer similar to FIG. 7, but showing the sensing and triggering mechanism in an actuated position as contrasted with the unactuated condition in FIG. 7;

FIG. 11 is a fragmentary, detail view illustrating the construction and function of the sensing elements associated with the side platforms;

FIG. 12 is a view similar to FIG. 11, but illustrating the relationship of the components as the side platform is returned to its level position from a dumping position thereof;

FIG. 13 is a fragmentary, vertical, cross-sectional view of the trailer taken substantially along line 13—13 of FIG. 1 and illustrating the way in which the side platforms are attached to the frame and releasably held in their level positions; and FIGS. 14–19 are diagrammatic illustrations of the way in which the bale-accumulating operations take place as related to the various movements of the mechanisms employed in accomplishing such formation.

In FIGS. 1 and 2 the trailer 10 is shown attached to the rear end of a baler 12 having a bale discharge chute 14. A pair of links 16 on opposite sides of the baler 12 pivotally interconnect the chute 14 and the trailer 10 so that the assembly thus formed can articulate about a transverse horizontal axis in response to changes in ground contour. A central fore-and-aft extending tongue 18 rigid to the trailer 10 is pivotally connected to the rear of the baler 12 to aid in the interconnection of the two implements.

The trailer 10 has a rigid frame 20 (FIG. 4) that includes a long, rectangular central section 22 and a pair of laterally outboard sections 24 (only one being visible in FIG. 4). A substantially central transverse frame member 26 spanning the entire width of the frame 20 has a pair of depending castor wheel assemblies 28 attached thereto at laterally outboard positions of the central frame section 22.

A central bale-receiving station aligned directly behind the chute 14 is defined by a central platform 30 overlying the central frame section 22. The platform 30 has a pair of generally planar portions 32 and 34 spaced apart in a fore-and-aft direction. A pair of laterally outboard stations on opposite sides of the central platform 30 are presented by left and right side platforms 36 and 38, respectively (viewed from the rear of the machine), such side platforms 36, 38 being displaced slightly rearwardly of the forwardmost end of the central platform 30 as perhaps seen best in FIGS. 1 and 2.

Each of the side platforms 36, 38 is mounted for independent swinging movement in a vertical direction between the substantially level position illustrated in solid lines in FIG. 2, and the dowwardly and rearwardly inclined position illustrated in phantom lines in that Figure. The central platform 30, however, does not tilt. Each of the platforms 36, 38 is swingable about the longitudinal axis of the transverse frame member 26 (FIG. 13), which is of cylindrical, tubular configuration. The center of gravity of each platform 36, 38 is so disposed that they are gravity-biased toward their tilted positions, yet each is provided with a tension spring 40 interconnecting the same with the outboard frame section 24 so as to yieldably retain the platforms 36, 38 in their level positions.

Although the springs 40 are sufficient to retain the unloaded platforms 36, 38 in their level positions, when massive bales are placed thereon, such as on the order of one ton or more, the springs 40 are not themselves sufficient to retain the platforms 36, 38 in their level positions, this being accomplished instead by a pair of releasable latches 42 (FIGS. 13, 3 and 2) for the two platforms 36, 38. Each latch 42 includes a depending catch 44 that is rockably secured to the corresponding platform 36, 38 by a transversely extending pivot 46. The catch 44 is notched at its lower end and biased by a torsion spring 47 toward and receives a rockshaft 48 on the outboard frame section 24. Rockshaft 48 has a small square cam 49 (FIG. 13) on its backside that engages the proximal lower portion of catch 44 when rockshaft 48 is rotated clockwise viewing FIG. 13, thereby to cam the catch 44 off the rockshaft 48 and release latch 42. A depending crank 50 is rigidly secured to the rockshaft 48 for operating the latter, and a rope (not shown) may lead from the lower end of the crank 50 up to the driver's seat of the tractor associated with the baler and trailer for manual actuation by the driver, there being a tension spring 52 connected between the crank 50 and the outboard frame section 24 so as to yieldably bias the crank 50 toward the position illustrated in FIG. 13, wherein the catch 44 is engaged with the rockshaft 48. Members 54 and 56, respectively, on the platforms 36, 38 and the outboard frame section 24 abut one another when the platforms 36, 38 are in their level positions as illustrated in FIG. 13 so as to prevent the return spring 40 from swinging the platform 36 or 38 beyond its level position.

A sensing and triggering treadle 58 is swingably connected via a piano hinge 60 to the rear of the central frame section 22 for vertical swinging movement between the raised position of FIG. 7 and the depressed position of FIG. 10. Depending from the treadle 58 through the central frame section 22 is a pair of laterally spaced, relatively narrow plates 62 that are rigidly affixed to the treadle 58 for swinging movement with the latter. A telescoping rod 63 interconnects the lower end of the plates 62 with the forwardly disposed lower end of a pair of immobile diagonally extending straps 64 that are rigid to the center frame section 22, a coil spring 66 surrounding the telescoping rod 63 and being trapped between the two sets of plates 62 on the one hand and straps 64 on the other hand so as to yieldably bias the treadle 58 toward its upward position.

The two depending plates 62 have a cross pin 68 therebetween midway between their upper and lower ends which is disposed for operating engagement with the rear end of a fore-and-aft extending latch lever 70 when the treadle 58 is depressed. Latch lever 70 in turn is swingably mounted on the central frame section 22 by a horizontal pivot 72 for releasable latching engagement with a crosspiece 74 between a pair of depending levers 76. A downwardly facing notch 78 in the lower edge of the latch lever 70 is engageable with the crosspiece 74 to releasably hold the levers 76 in the rearwardly disposed position of FIG. 7, the levers 76 being swingably attached to the central frame section 22 by a horizontal pivot 80.

A bifurcated depending component 82 forms a part of the latch lever 70 and serves as a rear limiting shoulder for a compression spring 84 that encircles a fore-and-aft extending bar 86 having a rear pivot 88 with the depending plates 62 and a front pivot 90 with the depending levers 76. The front pivot 90 serves as the opposite limiting shoulder for the coil spring 84, and also serves as the guide pin for a fore-and-aft extending slot 92 in the forward portion of the bar 86. The depending levers 76 are thus biased yieldably forwardly by the spring 84.

A push rod 94 is connected between the two levers 76 slightly above the horizontal pivot 90 and extends forwardly therefrom beneath the central platform 30 to a position slightly rearwardly of the transverse frame member 56, terminating in a forwardmost operating tip 96 (FIG. 7). In so doing, the rod 94 passes through a vertically elongated opening 98 in a generally U-shaped component (viewed in elevation), hereinafter referred to as a locator 100, that is mounted by a vertical pivot 102 on the central frame section 22 for horizontal swinging movement between a pair of laterally opposed stops 104 and 106 (FIG. 4). A short coil spring 108 (FIG. 7) biases the rod 94 downwardly to the lower end of the opening 98, and because of the lateral confinement of rod 94 within the opening 98, the tip 96 is swingable with the locator 100 between its two extreme positions, the connection of the rear end of the rod 94 with the depending levers 76 being loose enough to permit such horizontal moving swinging movement of the rod 94.

The tip 96 is normally engaged with one or the other of a pair of upright, triangular shoulder pads 110 and 112 which form part of a horizontally swingable lever 114 mounted on the central frame section 22 by a vertical fulcrum 116. The position of the stops 104 and 106 for the locator 100 is such that when the latter is against the stop 104, the tip 96 will be on the right side of the fulcrum 116 (as viewed from the rear of the machine) against the pad 112, while when the locator 100 is against the opposite stop 106, the tip 96 will be on the left side of the fulcrum 116 against the pad 110. Thus, forwardly directed pushing force in the rod 94 is transmitted to either side of the fulcrum 116 of the lever 114, depending upon the position of the locator 100.

A hydraulic valve 118 has a long fore-and-aft extending stem 120 thereof reciprocable axially between a pair of opposite extreme positions on opposite sides of a centered, neutral position. The rearmost end of the stem 120 is joined by connector 122 with the lever 114 on the left side of the fulcrum 116 so that swinging movement of the lever 114 results in shifting of the stem 120 between its neutral and operating positions as above-described. The valve 118 forms part of the hydraulic control circuit for a double-acting cylinder 124 having a ram 126 pivotally coupled at its outer end with one link 128 of a four-bar linkage 130 (FIG. 4) associated with a bale transfer device 132. The link 128 is located below the central platform 30 for swinging movement about a vertical pivot 136, and the second link 134 of linkage 130 is similarly swingable about a vertical pivot 138. Transfer device 132 takes the form of a fore-and-aft extending beam 140 pivotally connected at its opposite ends by pivots 142 and 144 to the linkage 130.

The beam 140 is located at a level slightly above the upper surface of the central platform 30, while the links 128 and 134 extend beneath the latter in underlying relationship to the planar portions 32 and 34 thereof. The length of ram 126 is such that, when extended, it swings the transfer beam 140 from the left side of the central platform 30 as illustrated in FIG. 1 to the opposite side thereof next adjacent the side platform 38, all the while maintaining the beam 140 parallel with the direction of travel of the machine.

The linkage 130 is also provided with a fore-and-aft extending tie bar 146 that is pivotally connected at its front end to the link 128 by a pivot 148, and is likewise pivotally connected at its rear end to the link 134 by a pivot 150. The tie bar 146 assures that the transfer beam 140 will indeed remain in its fore-and-aft disposition even as the same passes over center during its back-and-forth swinging motion during the bale transfer process.

A pentagonal plate 152 is secured to the tie bar 146 for movement therewith as the same shifts generally fore-and-aft during actuation of the transfer device 132, and such plate 152 has a pair of upstanding projections 154 and 156 that are spaced apart in a fore-and-aft direction and are interconnected by a strap 158 located a short distance above the upper surface of the plate 152. The lever 114 is received within the space between the strap 158 and the top surface of plate 152 and is disposed to be acted upon by the projections 154 and 156 after a predetermined amount of lost motion in a fore-and-aft direction of the plate 152.

On the bottom of the plate 152 a pair of depending limits 160 and 162 are provided that are likewise spaced apart in a fore-and-aft direction and which likewise have a strap 164 interconnecting the same and spaced a short distance below the bottom surface of the plate 152. A crank 166 fixed to the locator 100 beneath the lever 114 extends through and is received within the space between the strap 164 and the bottom surface of the plate 152 to be acted upon by the limits 160 and 162 after a predetermined amount of lost motion movement by the plate 152 during swinging of the transfer device 132 by the hydraulic cylinder 124.

The valve stem 120 of the hydraulic valve 118 carries a pair of truncated cones 168 and 170 that are spaced apart axially of the stem 120 to form a pair of spaced shoulders. As illustrated, the cones 168 and 170 have their chamfered or tapered portions generally facing one another, and they form a portion of what may broadly be referred to as "lockout mechanism" to prevent actuation of the valve 118 under certain circumstances. In addition to the cones 168 and 170, the lockout mechanism also includes a pair of transversely extending abutments in the form of blocking bars 172 and 174, and bar 172 being associated with the left side platform 36 and the bar 174 with the right side platform 38. The bars 172 and 174 are supported beneath the central frame section 22 for reciprocation transversely of the latter and are disposed in such a fore-and-aft relationship with the cones 168 and 170 that they can be inserted into the gap 176 between the cones 168, 170 when the stem 120 is in its neutral position as illustrated in FIG. 4. Note that bar 174 is located slightly forwardly of the bar 172 so that they clear each other and overlap in a fore-and-aft direction when they are inserted into the gap 176. Note further that the innermost ends of both bars 172, 174 have bevels 172a and 174a along their lower edges (FIG. 3) for facilitating entry into the gap 176.

The bars 172, 174 extend laterally outwardly from the cones 168, 170 to a position just slightly outboard of the central frame section 22 where they are joined to the lower end of respective depending cranks 178. Each of the cranks 178 is, in turn, rigidly affixed at its upper end to a fore-and-aft extending shaft 180 that is journaled to the central frame section 22 so as to adapt the cranks 178 for in-and-out swinging movement about the longitudinal axes of the shafts 180. The shafts 180 extend rearwardly from the cranks 178 to a position just behind the transverse frame member 56, where a second depending crank 182 connects each shaft 180 with a transversely extending push-pull rod 184 leading laterally outboard to the side platforms 36 or 38. The laterally outboardmost end of each rod 184 is connected to the lower end of an operating crank 186 that is swingable with a sensor element 188 about a fore-and-aft axis, the element 188 normally projecting upwardly through the corresponding side platform 36 or 38 are being joined to the crank 186 by virtue of a common fore-and-aft extending rockshaft 192 defining said axis.

Each sensor element 188 is vertically aligned with an enlarged cutout 194 in its corresponding side platform 36 or 38 so that the element 188 can indeed project upwardly through the platform 36 or 38 when the same is in its level position. The element 188 is, however, also depressible to a lowered position upon depression by an overlying bale as illustrated in FIG. 11. Yieldable means in the form of a leaf spring 196 (FIGS. 5 and 6) projecting laterally inwardly from each outboard frame section 24 frictionally engages the corresponding crank 186 so as to yieldably hold the corresponding sensor element 188 in either of its raised or depressed positions.

Each of the sensor elements 188 is mounted on the frame 24 of the corresponding side platform 36 or 38 and therefore does not swing with the latter during bale dumping. Return means 198 (FIGS. 11 and 12), however, constructed somewhat similar to the elements 188, is mounted on each of the platforms 36 and 38 for movement therewith during such swinging. Each of the return means 198 includes a sensing plate 200 that is swingably supported on the corresponding platform 36 or 38 by a fore-and-aft extending pivot 202 for movement between a normal position (FIG. 12) projecting upwardly through the cutout 194 and a depressed, substantially level position (FIG. 11). A coil spring 204 yieldably biases each of the plates 200 toward its upwardly projecting normal position wherein a stop 206 is engaged by a depending leg 208 associated with the plate 200. The leg 208 is so positioned that, when the plate 200 is cocked upwardly as in FIG. 12 during the return of the corresponding platform 36 or 38 to its level position, the leg 208 is disposed to engage and operate a proximal leg 210 associated with the corresponding sensor element 188 so as to overcome the resistance of the leaf spring 196 and return the element 188 to its upwardly projecting position.

OPERATION

The operation of the trailer 10 may be briefly summarized as follows. As a bale issues from the discharge chute 14, it inches its way rearwardly onto the central platform 30 until such time as it fully depresses the treadle 58 at the rear of the machine. The treadle 58 will normally be fully depressed only after the full bale has been completely discharged from the chute 14 and a substantial portion of the next succeeding bale is protruding from the same into engagement with the central platform 30. Once the treadle 58 is depressed, it actuates the hydraulic valve 118 which in turn supplies fluid to the cylinder 124 to actuate the transfer device 132. The bale is thereupon swept rightwardly or leftwardly by the transfer device 32, depending upon the latter's immediately preceding position, so as to load one or the other of the side platforms 36 and 38. This clears the central platform 30 for the arrival of the next succeeding bale which likewise depresses the treadle 58 and causes the transfer device 132 to sweep in the opposite direction and load the second bale onto the other of the side platforms 36 or 38. This, again, clears the central platform 30 so that a third bale may be received, by which time the driver should be near the end of the row so that the accumulated load can be dumped. By first dumping the two side platforms 36 and 38, actuation of the transfer device 132 will thereupon distribute the third bale onto one of the empty platforms 36 or 38 which can then be dumped so that all three bales are left in a pile at the same location. The driver is then ready to head down along the next row to accumulate three more bales in the same manner as above-described.

A more detailed description of the accumulation and dumping process may be understood by reference in part to the diagrammatic illustrations in FIGS. 14-19. Prior to any bales being accumulated on the trailer 10, the treadle 58 is fully raised as in FIG. 3, the sensing elements 188 and the sensor plates 200 are tipped upwardly to project through the cutouts 194, and the blocking bars 172, 174 are retracted out of the gap 176 between the control cones 168, 170, the valve stem 120 being in its neutral position at that time as illustrated in FIG. 4.

As the first bale progresses rearwardly and depresses the treadle 58, nothing happens until the cross pin 68 sufficiently depresses the rear end of the latch lever 70 to lift the notch 78 thereof off the crosspiece 74, thereby enabling the spring 84 to snap the depending levers 76 forwardly. This thrusts the tip 96 of actuating rod 94 against the pad 112 of lever 114 with sufficient force to swing the latter counterclockwise viewing FIG. 14 so as to in turn pull rearwardly on the valve stem 120. This corresponds to the condition of things in FIG. 14.

Such rearward actuation of the valve stem 120 permits pressurized fluid to enter the hydraulic cylinder 124 and extend the ram 126 so as to cause the transfer device 132 to sweep from left to right across the central platform 30, depositing the first bale onto the right side platform 38 in the process. Once the bale is pushed off the treadle 58, the spring 66 returns the same to its upwardly cocked position, lifting the cross pin 68 from the latch lever 70 and pulling the depending levers 76 rearwardly so as to reposition the crosspiece 74 within the latching notch 78. This, of course, also pulls the actuating rod 94 rearwardly and resets things for the next bale.

Such return of the actuating rod 94 to a rearward position is not immediate, however, and in fact is delayed until after the transfer device 132 has completed its full sweep. Thus, as the transfer device 132 sweeps rightwardly, the lever 114 remains in its FIG. 14 position, as does the locater 100, until the end of the sweep cycle is approached, whereupon the rear limit 160 of the forwardly moving plate 152 engages the crank 166 to swing the locator 100 clockwise to the opposite side of the fulcrum 116 to the extent illustrated in FIG. 15. This also carries the tip 96 to the left side of the fulcrum 116, and inasmuch as the lever 114 remains in its FIG. 14 position until a short time later, transfer of the tip 96 to the left side of the fulcrum 116 is accomplished without shutting off the valve 118 by having the tip 96 enter a space 212 between the triangular pads 110 and 112, thereupon riding upon an uppermost, non-force-transmitting surface or edge 110a of the pad 110. Then, when the rear projection 154 engages and swings forwardly the lever 114 to shut off the valve 118 and terminate the sweeping stroke of the transfer device 132, the tip 96 falls down to a position just rearwardly of the pad 110 in force-transmitting relationship therewith. Note that the vertically elongated opening 98 in the locater 100 permits such up-and-down movement of the tip 96 under the influence of the tension spring 108.

The lever 114, the actuating rod 94, and the valve stem 120 thus come into the position of FIG. 15. In the meantime, however, the sensing plate 188 associated with the right side platform 38 has been depressed by the first bale moving onto the latter (so also has the adjacent sensing plate 200 as illustrated in FIG. 11). Thus, the right blocking bar 174 has been shifted inboard into the gap 176 between the cones 168, 170. Until the blocking bar 174 is subsequently removed, the valve 118 cannot again be actuated to sweep the transfer device 132 toward the right side platform 38, even though the transfer device 132 will subsequently be in its leftmost position, otherwise ready to make such rightward movement.

With the components thus in the condition illustrated in FIG. 15, arrival of the second bale onto the central platform 30 causes the treadle 58 to be depressed in the above-described manner. This time, although movement of the actuating rod 94 is again forwardly, the lever 114 is rotated clockwise viewing FIG. 15 out of its neutral position inasmuch as the tip 96 of rod 94 applies force on the left side of the fulcrum 116. Therefore, the valve stem 120 is pushed forwardly so as to actuate valve 118 in the opposite direction as illustrated in FIG. 16. This causes the ram 126 of the cylinder 124 to be retracted, thereby sweeping the transfer device 132 leftwardly across the platform 30 to distribute the second bale onto the left side platform 36, the transfer device 132 ending up adjacent the left side platform 36 as illustrated in FIG. 17.

As the plate 152 moves rearwardly during leftward swinging of the transfer device 132, the crank 166 of locater 100 is engaged and operated by the front limit 162 so as to swing the locater 100, and thus the tip 96, in a counterclockwise direction over to the right side of the abutment 116. As before, inasmuch as such shifting of the tip 96 occurs prior to return of the valve stem 120 to its neutral position, the tip 96 enters the space 212 between the pads 110 and 112, thereupon riding up along the non-force-transmitting upper edge 112a of the pad 112. When the lever 114 is thereupon engaged and operated by the rearwardly moving front projection 156 so as to swing the lever 114 counterclockwise to its neutral position, the tip 96 falls down to a position just rearwardly of the pad 112 in force-transmitting position therewith.

Note that as the second bale is distributed onto the left side platform 36, it engages and depresses the sensor element 188 and the sensing plate 200 associated with the platform 36. As a result of depression of the sensing element 188, the left blocking bar 172 is shifted inboard into the gap 176 as illustrated in FIG. 17. In this position, the blocking bar 172 precludes movement of the stem 120 in a forward direction because of interference with the rear cone 170. In fact, inasmuch as both blocking bars 172 and 174 are in place within the gap 176, actuation of the stem 120 is prevented in either direction.

With the transfer device 132 thus in its leftmost position and the central platform 30 cleared, the latter is again ready for the arrival of the third bale. The third bale emerges from the chute 14 and depresses the treadle 58. However, even though the third bale is thus ready to be transferred laterally as illustrated in FIG. 18, the valve 118 cannot be actuated because the blocking bars 172 and 174 are in place. Parenthetically, it should be noted that depression of the treadle 58 is permitted, notwithstanding the fact that the rod 94 cannot be thrust forwardly, because the slot 92 in the bar 86 at the rear of the machine allows the bar 86 to be pushed forwardly even though the levers 76 remain substantially stationary. Spring 84 behaves as a relief spring under these circumstances.

Noting that the trailer 10 is fully loaded, the operator may then begin the dump cycle by pulling the ropes (not shown) associated with either or both of the latches 42 for the side platforms 36, 38. If both of the latches 42 are released, then both platforms 36, 38 will be gravity-biased to their dumping positions illustrated in phantom lines in FIG. 2, permitting the bales to slide thereoff onto the ground as slight forward movement of the trailer 10 is continued. Return springs 40 swing the emptied platforms 36 and 38 back to their level positions, relatching the latches 42 in the process.

It is important to note that during the dumping procedure, the sensor elements 188 associated with the platforms 36 and 38 remain depressed by virtue of the leaf springs 196, even though the weight of the bales is relieved from the sensor elements 188 because of the fact that the bales swing upwardly with the platforms 36, 38 while the sensors 188 remain behind with the frame 20. As the platforms 36, 38 are then returned to their level positions, the leg 208 of each return means 198 on the platforms 36, 38 strikes the inboard-projecting leg 210 associated with the corresponding sensor element 188 to overpower the leaf spring 196 and slip the sensor element 188 back to its upwardly cocked position. This manifestly withdraws both the blocking bars 172, 174 from the space between the cones 168, 170, permitting the "relief" spring 84 at the rear of the trailer 10 to snap the operating rod 94 forwardly and actuate the valve 118. Thus, the transfer device 132 then sweeps rightwardly to deposit the third bale on the right platform 38, whereupon the third bale may then be dumped from the platform 38 in the manner above-explained. Upon return of the platform 38 to its level position, all components are thereupon in condition for the formation of a new three-bale load.

It is significant to note that, as shown in FIG. 19, both bales on the side platforms 36, 38 need not be dumped in order to ready the transfer device 132 for operation, it being only necessary to empty that particular side platform 36, 38 which the sequence of events has determined to be the recipient of the next bale from the central platform 30. Thus, as illustrated in FIG. 19, upon dumping the right platform 38, the right blocking bar 174 is withdrawn from between the cones 168 and 170, permitting the valve stem 120 to be shifted rearwardly so as to correspondingly sweep the transfer device 132 toward the right platform 38 and load the same with the bale.

It is contemplated that a signal system (not shown) of suitable form may be located in the cab of the towing vehicle so as to advise the driver of the status of the various procedures occurring on the trailer 10 behind him. This may be particularly significant in the event that his vision to the rear is obscured by the presence of the baler 12.

Thus, a switch 214 (FIG. 4) might be provided in conjunction with the treadle 58 to control the actuation of a signal device which would indicate that a bale has arrived on the central platform 30. Likewise, a second switch 216 may be actuated by the transfer device 132 when the latter is in its leftmost position so as to indicate said position; correspondingly, a third switch 218 would be actuated by the transfer device 132 when the latter is in its rightmost position so as to indicate that particular location of the device 132. Many other arrangements are, of course, possible insofar as providing the necessary signals to the driver is concerned.

Having thus described the invention, what is claimed as new and desired to be secured by Letters Patent of the United States is:

1. In combination with a valve having a stem reciprocable axially to either of two opposite positions corresponding to a pair of alternative control functions, actuating mechanism for effecting alternating performance of said control functions by the valve notwithstanding a common triggering input for all of said performances, said mechanism including:
   a triggering member shiftable in one direction through a predetermined displacement during each said triggering input to the valve;
   a lever coupled with said stem in such a way that swinging of the lever a predetermined amount in one direction about its fulcrum moves the stem to one of said positions, while swinging a predetermined amount in the opposite direction moves the stem to the other of said positions;
   each of said displacements of the member being sufficient to accomplish said predetermined amount of swinging on the part of said lever; and
   means for transmitting successive said displacements of the member to the lever on alternate sides of said fulcrum.

2. In the combination as claimed in claim 1, wherein said member is physically moved to an opposite side of the fulcrum by said transmitting means during the performance of a control function, said lever and said member having means intercoupling the same in a way to avoid having the member swing the lever out of either of said positions and to the opposite of said positions during said movement of the member.

3. In the combination as claimed in claim 2, wherein said member has a tip, said intercoupling means including a pair of spaced, tip-engageable shoulders on opposite sides of said fulcrum, said tip being disposed to slip into the space between said shoulders and extend beyond the latter so as to ride along a non-force-transmitting surface of the shoulders as said movement is carried out.

4. In the combination as claimed in claim 1, wherein said means includes structure shiftable in two opposite directions corresponding to the performance of said two control functions, said means further including a locater coupled with said member and operable by said structure to move said member from one side to the opposite side of said fulcrum during said shifting of the structure.

5. In the combination as claimed in claim 4, wherein said structure includes a pair of spaced limits receiving said locater therebetween, said space between the limits permitting a predetermined amount of lost motion on the part of said structure before effecting said movement of the member.

6. In the combination as claimed in claim 1, wherein said stem has a neutral position between said two opposite positions; and means other than said member for returning said lever to a location corresponding to said neutral position of the valve stem at the completion of a said control function.

7. In the combination as claimed in claim 6, wherein said return means is shiftable in two opposite directions corresponding to the performance of said two control functions, said return means engaging and operating said lever to return the same during said shifting of the return means.

8. In the combination as claimed in claim 7, wherein said return means includes a pair of spaced projections receiving said lever therebetween, said space between the projections permitting lost motion by said projections corresponding substantially to the length of each performance.

9. In the combination as claimed in claim 8, wherein said member is physically moved to an opposite side of the fulcrum by said transmitting means during the performance of a control function, said lever and said member having means intercoupling the same in a way to avoid having the member swing the lever out of either of said positions and to the opposite of said positions during said movement of the member.

10. In the combination as claimed in claim 9, wherein said member has a tip, said intercoupling means including a pair of spaced, tip-engageable shoulders on opposite sides of said fulcrum, said tip being disposed to slip into the space between said shoulders and extend beyond the latter so as to ride along a non-force-transmitting surface of the shoulders as said movement is carried out.

11. In the combination as claimed in claim 10, wherein said transmitting means includes a swingable locater coupled with said member for effecting said movement thereof, said transmitting means further including a pair of spaced limits shiftable with said projections and disposed to receive said locater therebetween for operating the same during said shifting of the limits.

* * * * *